(12) United States Patent  
Wentland et al.

(10) Patent No.: US 8,876,050 B2  
(45) Date of Patent: Nov. 4, 2014

(54) KNOWLEDGE BASED ACCESS AND ACCESS HIERARCHY IN AN AIRCRAFT

(75) Inventors: Mark E. Wentland, Lynnwood, WA (US); Bret L. Lamoree, Snohomish, WA (US); James P. Schalla, Edmonds, WA (US); Bradley J. Mitchell, Snohomish, WA (US); Kwu-Wing W. Cheung, Shoreline, WA (US); Phillip J. Bobzien, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1354 days.

(21) Appl. No.: 12/059,922

(22) Filed: Mar. 31, 2008

(65) Prior Publication Data

US 2009/0242699 A1 Oct. 1, 2009

(51) Int. Cl.  
*B64C 1/14* (2006.01)  
*G07C 9/00* (2006.01)  
*B64D 11/04* (2006.01)

(52) U.S. Cl.  
CPC ........ *G07C 9/00182* (2013.01); *G07C 9/00563* (2013.01); *B64D 11/04* (2013.01); *B64C 1/1407* (2013.01)  
USPC ..................................... 244/129.4; 244/118.5

(58) Field of Classification Search  
USPC ....................... 244/129.4, 129.5, 129.1, 118.5  
See application file for complete search history.

(56) References Cited

U.S. PATENT DOCUMENTS

| | | | |
|---|---|---|---|
| 4,884,767 A | 12/1989 | Shibata | |
| 5,150,863 A | 9/1992 | Hozumi | |
| 6,474,599 B1* | 11/2002 | Stomski | 244/118.5 |
| 6,696,979 B2 | 2/2004 | Manten et al. | |
| 6,702,231 B2 | 3/2004 | Ward | |
| 6,817,577 B2 | 11/2004 | Semprini | |
| 6,844,817 B2 | 1/2005 | Gleine | |
| 7,014,148 B2 | 3/2006 | Dominguez | |
| 2003/0006342 A1* | 1/2003 | Page, Jr. | 244/118.5 |
| 2003/0146347 A1 | 8/2003 | Roessner et al. | |
| 2009/0065641 A1* | 3/2009 | Koehn et al. | 244/118.5 |

OTHER PUBLICATIONS

"Flight Operations Briefing Notes", Aug. 2007, Airbus, Ground Handling.*

* cited by examiner

*Primary Examiner* — Brian M O'Hara  
(74) *Attorney, Agent, or Firm* — Yee & Associates, P.C.

(57) ABSTRACT

A method and apparatus for a hierarchical access system for a compartment. The hierarchical access system comprises a moveable barrier, a locking mechanism, and a control unit. The moveable barrier is capable of preventing access to at least one of a first space and a second space in the compartment in the lavatory when the moveable barrier is in a closed position. The locking mechanism is capable of securing the moveable barrier in the closed position. The control unit is capable of unlocking the locking mechanism in a manner that provides different levels of access to the first space and the second space in the compartment in response to receiving an access request.

17 Claims, 8 Drawing Sheets

KNOWLEDGE BASED ACCESS AND ACCESS HIERARCHY IN AN AIRCRAFT

BACKGROUND INFORMATION

1. Field

The present disclosure relates generally to aircraft and in particular to accessing areas in an aircraft. Still more particularly, the present disclosure relates to providing hierarchical access to areas in an aircraft.

2. Background

Airline procedures may be important to ensure the safety and security for passengers using air travel. Currently, inspections of the interior of an aircraft may be made to prevent placement or identify prohibited objects and/or items in an aircraft. The current inspections may be performed to ensure the finding of and/or disposing of these types of objects. Aircraft regularly undergo vigorous inspections each day and while cleaning the aircraft between flights resulting in several man-hours per airplane per day. If any areas appear to be tampered with, a more thorough inspection may then be performed.

These and other types of inspections may be time consuming and may increase the amount of time needed between flights. These types of inspections may reduce the number of flights possible, as well as requiring increased personnel to perform inspections.

Attempts have been made to make inspections easier to perform. For example, life vests have been put in boxes or compartments with doors. These doors may then be sealed with a tamper evident device. As a result, a visual inspection may be quickly made to determine whether the tamper evident device is intact.

Visually inspecting the spaces, including seat cushions, is labor intensive. This type of inspection increases expense and time to operate flights. Most spaces in an aircraft may not be accessed or tampered with the majority of the time.

In another example, when inspecting lavatories, for instance, an inspector may be required to open all access panels and/or compartment doors inside of the lavatory. This inspection may include a visual inspection of all potentially accessible volumes and spaces behind access panels and/or compartment doors. Further, the inspection may be performed in a fairly tight, enclosed space. The access panels and/or compartments may be typically used for bathroom amenities, such as, for example, bathroom tissues, soaps, lotions, and other suitable amenities.

Further, these spaces also may allow airline personnel to access various mechanical devices and/or electrical hardware that may enable lavatory operation, removal, and/or installation. Further, other compartments that may be present may include, for example, without limitation, a waste container compartment. This type of compartment may be opened to gain access to the waste container. Also, this compartment may be used to gain access to other maintenance related spaces behind the waste container. Thus, the inspection of a lavatory may be tedious and time consuming.

Therefore, it would be advantageous to have an improved method and apparatus to overcome the problems described above.

SUMMARY

The advantageous embodiments provide a method and apparatus for a hierarchical access system for a compartment. The hierarchical access system comprises a moveable barrier, a locking mechanism, and a control unit. The moveable barrier is capable of preventing access to at least one of a first space and a second space in the compartment in the cabin when the moveable barrier is in a closed position. The locking mechanism is capable of securing the moveable barrier in the closed position. The control unit is capable of unlocking the locking mechanism in a manner that provides different levels of access to the first space and the second space in the compartment in response to receiving an access request.

In another advantageous embodiment, an apparatus comprises a set of structures and a set of access devices. The set of structures partition an enclosed area into a plurality of spaces. The set of access devices is capable of selectively providing access to different spaces within the plurality of spaces using a policy to evaluate a request to access a space within the plurality of spaces.

In still another advantageous embodiment, a hierarchical access system for a compartment in an aircraft comprises a moveable barrier, a locking mechanism, and a control unit. The moveable barrier is capable of preventing access to at least one of a first space and a second space in the compartment in a lavatory, when the moveable barrier is in a closed position and wherein the moveable barrier is selected from one of a louver door, a blind door, a sliding door, a bypass door, a roll up door, a flip up hatch, a slide out drawer, a tip out compartment, a removable panel, a pocket door, and a removable fabric barrier. The locking mechanism is capable of securing the moveable barrier in the closed position. The control unit is capable of unlocking the locking mechanism in a manner that provides different levels of access to the first space and the second space in the compartment in response to receiving an access request, wherein the control unit provides one level of access to the first space and the second space when the aircraft is in a first mode and provides another level of access to the first space and the second space when the aircraft is in a second mode, wherein the control unit provides access to the first space in response to the access request identifying a requester as a person in a first group of personnel and providing access to the second space in response to identifying the requester as a person in a second group of personnel, and wherein the control unit generates a warning message when the access request is unsuccessful.

In yet another advantageous embodiment, a method is provided for accessing an enclosed area in an aircraft. A request is received from an authorized user to access an access restricted space within the plurality of spaces in the enclosed area in the aircraft. A determination is made, by a control unit, whether to allow the user to access the access restricted space. In response to a determination by the control unit to allow the user access to the access restricted space, a barrier is unlocked to the access restricted space.

Another advantageous embodiment provides a method for controlling access to a compartment in a lavatory of an aircraft. An access request is received from a control unit to access the compartment in the lavatory to form a received access request, wherein the control unit controls access to the compartment. A search is performed for a user identification based on the received access request. Responsive to a determination that the user identification is present, a mode of the aircraft is identified. A determination is made as whether to allow access using the user identification and the mode of the aircraft. Responsive to a determination that user access is allowed, an access signal is sent to the control unit to unlock a barrier restricting access to the compartment in the lavatory. Responsive to an absence of a determination that that user access is allowed, a denial signal is sent to the control unit.

Responsive to an absence of a determination that that user access is allowed, an indicator is generated to indicate that access attempt has been made. Accesses to the compartment and attempted accesses to the compartment are logged.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
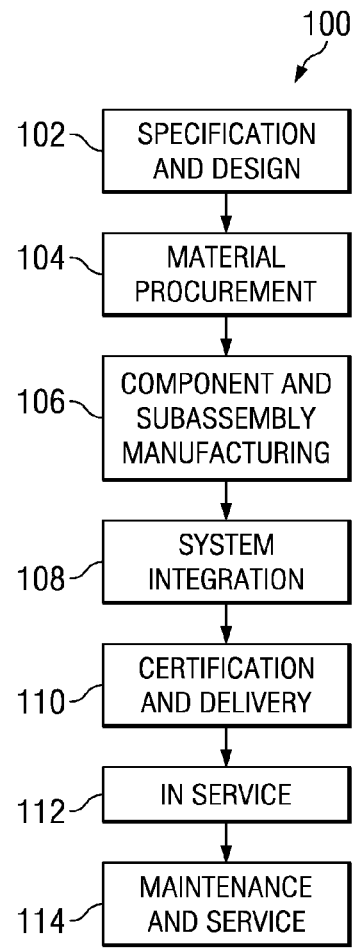
FIG. 1 is a diagram illustrating an aircraft manufacturing and service method in accordance with an advantageous embodiment.
Figure 2:
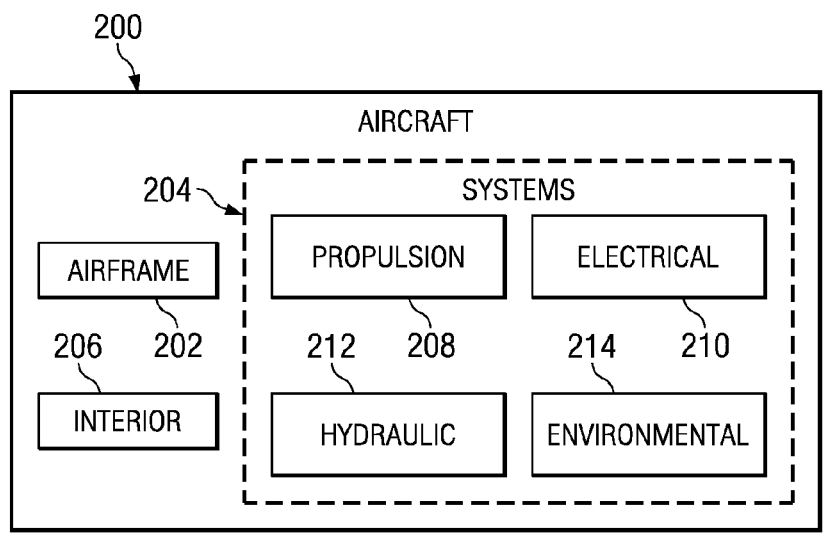
FIG. 2 is an illustration of a block diagram of an aircraft in which an advantageous embodiment may be implemented.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment.

During pre-production, exemplary aircraft manufacturing and service method 100 may include specification and design 102 of aircraft 200 in FIG. 2 and material procurement 104. During production, component, and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include inspections, modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other mobile and fixed based industries, such as the automotive industry and commercial buildings requiring varying levels of limited access to spaces, such as access for tenants and building maintenance.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the initial and/or operating cost of aircraft 200. Similarly, one or more of apparatus embodiments, method embodiments, or a combination thereof may be utilized while aircraft 200 is in service 112 or during maintenance and service 114 in FIG. 1.

More specifically, different advantageous embodiments may be implemented to provide hierarchical access to various areas within interior 206 of aircraft 200. For example, access mechanisms described in the different advantageous embodiments may be implemented during system integration 108. Further, the different advantageous embodiments may be added aircraft 200 during maintenance and service 114. The access mechanisms in the advantageous embodiments may be employed to control and/or limit the manner in which different people may access different locations within aircraft 200.

The different advantageous embodiments recognize that many areas in an aircraft may be easily accessible. For example, without limitation, the advantageous embodiments recognize that in a lavatory the lower under sink cabinet and the over sink vanity cabinet may be accessed by almost anyone entering the lavatory.

As a result, current procedures may provide for inspection of these areas multiple times on a daily basis to ensure that tampering and/or placement of unauthorized objects within these spaces have not occurred. This type of inspection may include, for example, without limitation, opening up each door to a space, removing the contents, and/or thoroughly searching the space. These types of inspections occur whether or not a particular space may have been compromised.

The different advantageous embodiments recognize that many spaces have multiple uses. For example, in the lavatory one or more cabinets may include items that a cabin crew needs access to during a flight. These items include, for example, without limitation, paper towels, paper cups, and other amenities. Further, the same space may include access to systems that may be needed only by maintenance personnel. For example, without limitations, attach fittings, valves, wiring, circuits, and other devices may also be located in these spaces.

Currently, the different advantageous embodiments recognize that a solution may be to store items needed for one particular type of access in one cabinet with other items being stored in a different cabinet. Also, the cabin crew may need access to items in flight, and the maintenance personnel may need access to items typically on the ground.

The aircraft may be divided into access areas based on where the airplane is located, allowing only the most intensive intrusion into space when the aircraft is on the ground. These cabinets may be separately locked and/or secured through mechanisms, such as, for example, keys, cards, file scanning mechanisms, biometrics, and/or other suitable devices. In this manner, only authorized personnel may access particular spaces.

The different advantageous embodiments recognize that this type of access may be inefficient because often times a particular space may have multiple uses. For example, without limitation, a vanity cabinet in a lavatory may hold papers towels and may provide access to shut valves that may be located behind the paper towels. Access to this type of space may be needed by different types of airline personnel. These personnel include, for example, without limitation, service personnel and/or maintenance personnel. Service personnel typically may only require access to spaces that contain bathroom amenities. Maintenance personnel typically may require access to spaces that house maintenance items. These maintenance items include, for example, shut off valves, electrical hardware, installation attachment points and other suitable components.

Thus, the different advantageous embodiments may divide an area into separate spaces with different access mechanisms for each space. The different advantageous embodiments provide hierarchy access to different spaces within the area. In the different illustrative examples, these areas may, for example, include a cabinet, a closet, or some other suitable area.

Figure 3:
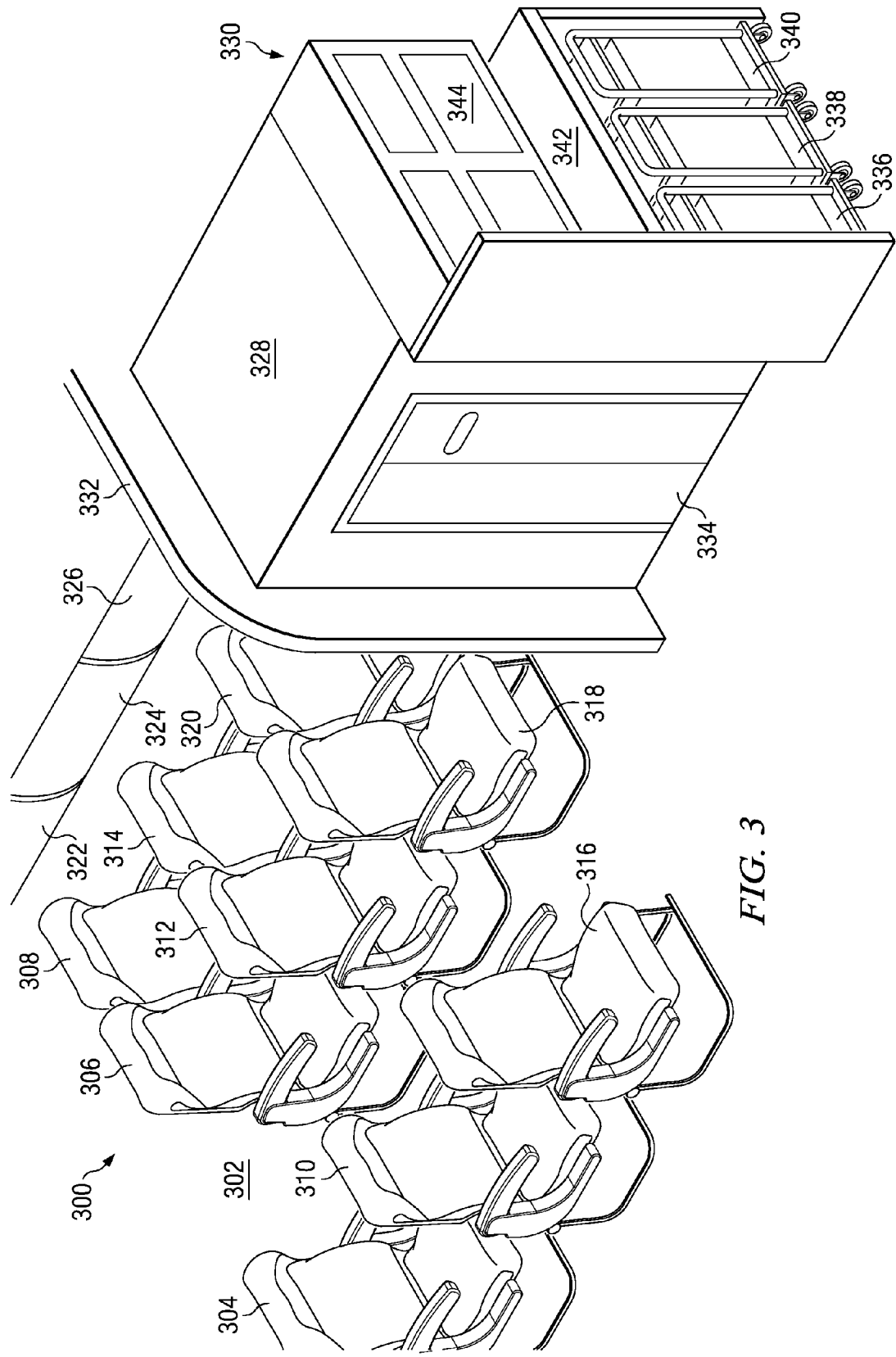
FIG. 3 is an illustration of a portion a passenger cabin in accordance with an advantageous embodiment.

With reference now to FIG. 3, an illustration of a portion of a passenger cabin is depicted in accordance with an advantageous embodiment. In this example, passenger cabin 300 is an example of a seating area that may be present in interior 206 of aircraft 200 in FIG. 2. Passenger cabin 300 may include passenger seating in seating area 302. Passenger seating may include aircraft seats 304, 306, 308, 310, 312, 314, 316, 318, and 320.

Further, seating area 302 in passenger cabin 300 may also include storage areas, such as overhead compartments 322, 324, and 326. Passenger cabin 300 also may include lavatory 328 and galley area 330. These two areas may be partitioned or separated from seating area 302 by a partitioning structure such as, for example, without limitation, wall 332. Lavatory 328 may have door 334, which allows entry into lavatory 328.

Further, galley area 330 may include carts 336, 338, and 340, which may be stored under counter 342. Further, galley area 330 also may include cabinets 344. Cabinets 344 may store various items, such as, for example, without limitation, drinks, tableware, plates, cups, napkins, coffee, and other suitable items for the galley area 330.

Different advantageous embodiments may be implemented within different areas of passenger cabin 300 to limit access. In the different advantageous embodiments, the access may be limited and/or provided on a hierarchical basis. For example, access to different spaces within lavatory 328 may be managed using advantageous embodiments. Of course, the different advantageous embodiments may be applied to other spaces within passenger cabin 300 and within the entire aircraft.

This illustration of passenger cabin 300 for an aircraft is provided for purposes of illustrating one environment in which the different advantageous embodiments may be implemented. The illustration of passenger cabin 300 in FIG. 3 is not meant to imply architectural limitations as to the manner in which different advantageous embodiments may be implemented. For example, other areas may be present in addition to passenger seating area 302, lavatory 328, and galley area 330. Other areas may include, for example, without limitation, closets, storage areas, lounges, and other suitable areas for passenger seating 300.

As another example, airplane seats within seating area 302 may be arranged differently from the depicted example. In other advantageous embodiments, seats may be grouped into sets of three, four, five, or any number of aircraft seats instead of two or single seats as illustrated in seating area 302.

Figure 4:
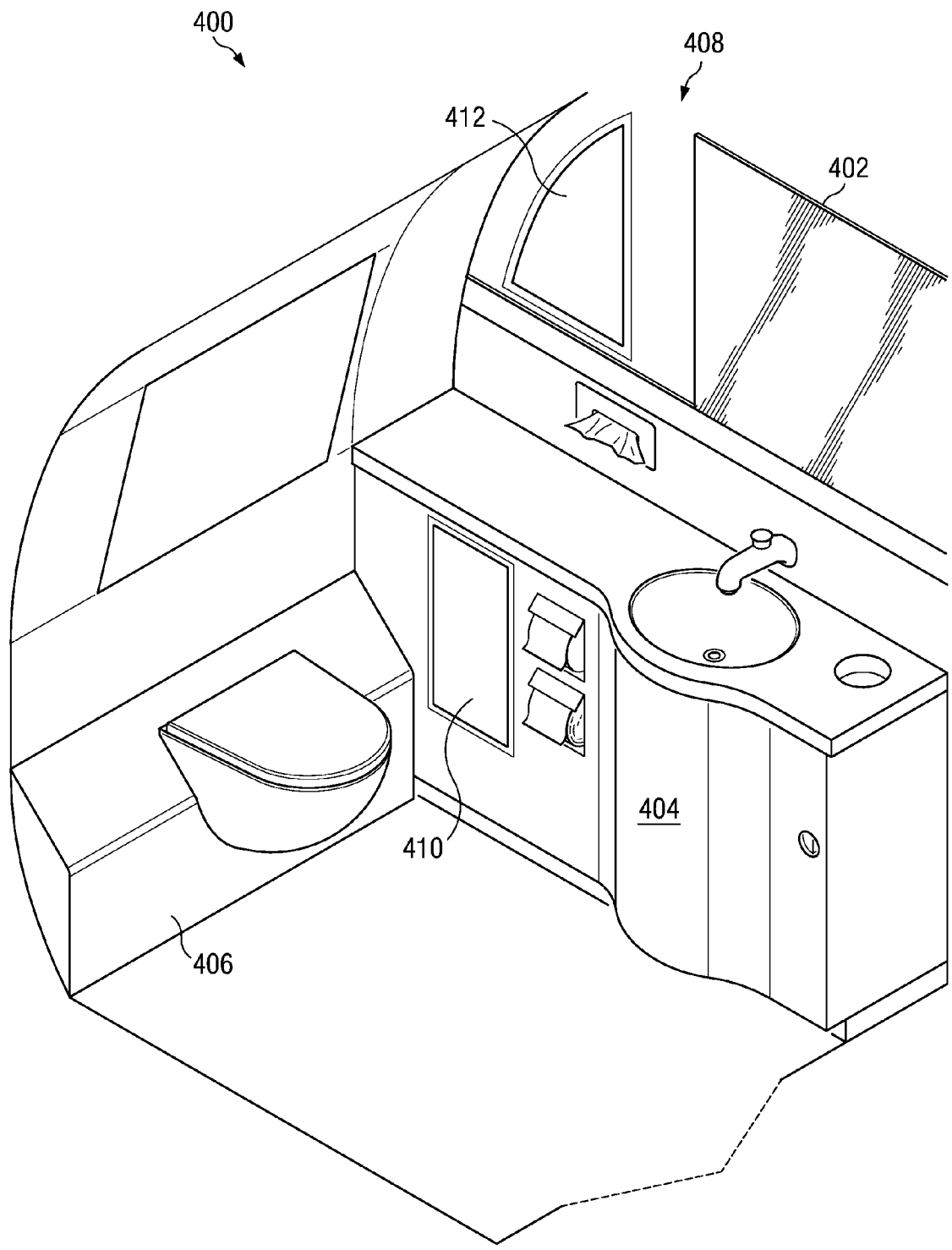
FIG. 4 is an illustration of a lavatory in accordance with an advantageous embodiment.

With reference now to FIG. 4, an illustration of a lavatory is depicted in accordance with an advantageous embodiment. In this example, second lavatory 400 may be an example of lavatory 328 in FIG. 3. Second lavatory 400 may include areas in which advantageous embodiments may be implemented. For example, second lavatory 400 may include vanity cabinet 402 in under sink cabinet 404, and toilet shroud 406 as areas which access may be restricted.

These areas are examples of areas in advantageous embodiments may be implemented to provide hierarchical access to different portions and/or spaces in these areas. In other words, different types of access may be provided for different portions of areas within vanity cabinet 402, under sink cabinet 404, and toilet shroud 406 by different personnel. In some advantageous embodiments, certain personnel may have access to all areas, while other personnel may only have access to limited areas. Further, this access also may be based on different flight status, states or modes of the aircraft.

The illustration of cabinet 402, cabinet 404, and toilet shroud 406 in second lavatory 400 are presented as areas in which hierarchical access may be provided. This illustrative example is not meant to limit the manner or places in which the different advantageous embodiments may be implemented. For example, advantageous embodiments may be used to provide access to other areas within second lavatory 400. These areas include, for example, without limitation, space behind lavatory wall panel 408, waste container 410, light bezel 412, and/or some other areas within second lavatory 400.

Further, the different advantageous embodiments may be applied to other areas within an aircraft. For example, spaces behind air return grills may include a shut off valve that may need to be accessed in flight. Other areas or other grills may only need access for maintenance purposes. As yet another example of other areas in an aircraft in which advantageous embodiments may be implemented, a closet may be partitioned into areas in which different levels of access may be provided. For example, a main area of a closet that may be accessed during flight while other areas may include spaces containing electronics, devices, or other aircraft infrastructure that may only need access by maintenance personnel on the ground.

Figure 5:
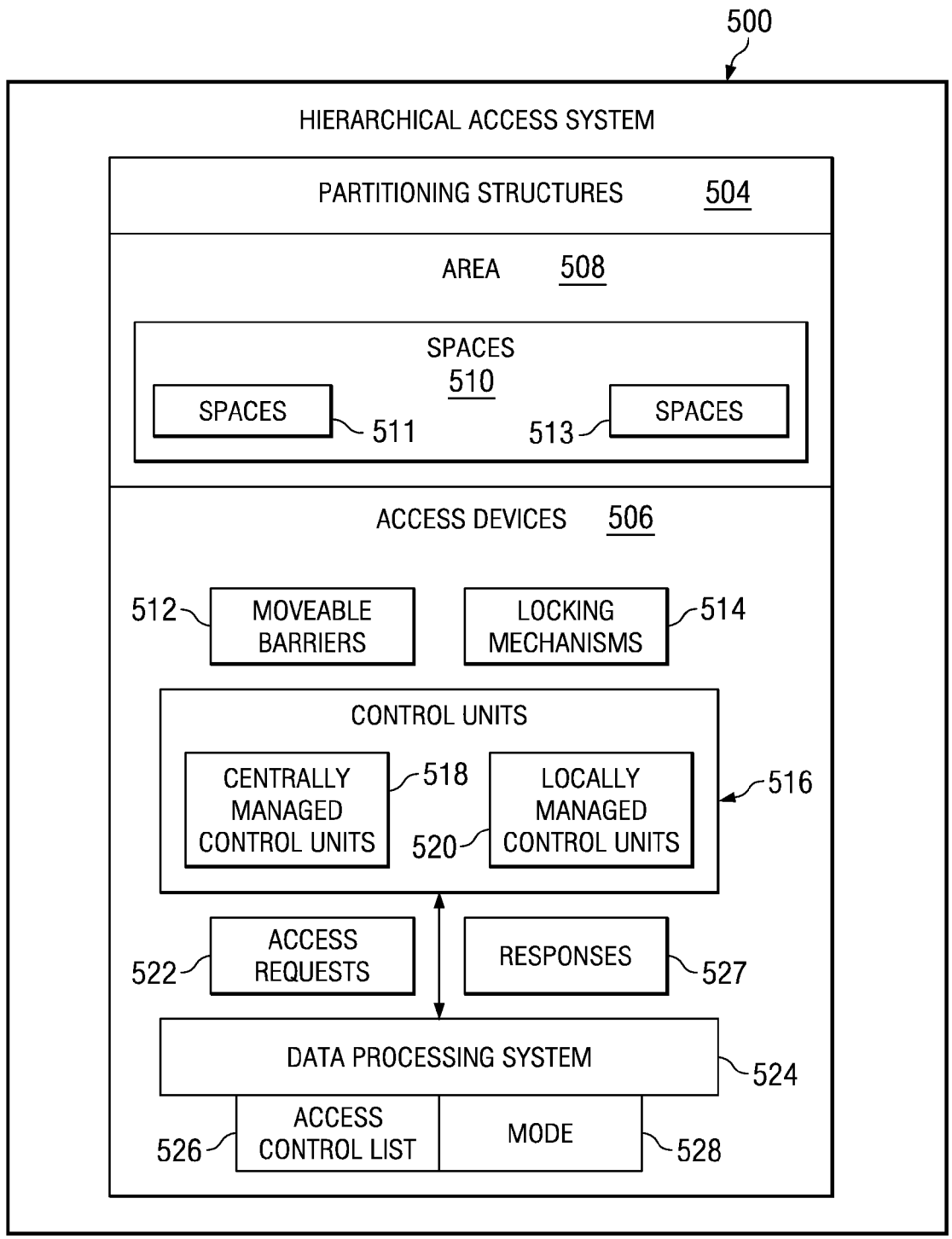
FIG. 5 is a diagram illustrating a hierarchical access system in accordance with an advantageous embodiment.

With reference now to FIG. 5, a diagram illustrating a hierarchical access system is depicted in accordance with an advantageous embodiment. In this example, hierarchical access system 500 may be employed to provide different levels of access for an area, such as, vanity cabinet 402 and/or under sink cabinet 404 of FIG. 4. Of course, hierarchical access system 500 may be applied to other spaces within an aircraft. For example, hierarchical access system 500 may be used in other areas, for example, without limitation, closets, areas behind a removable wall panel, cabinets in a galley, air return grills, and other suitable areas in an aircraft.

In this example, hierarchical access system 500 includes partitioning structures 504 and access devices 506. Partitioning structures 504 may be any structure that may be used to partition area 508 into spaces 510. Spaces 510 may be two or more spaces in this example. Access devices 506 may be employed to control access to spaces 510. Depending on the particular limitation, a single access device may be used to restrict access to space 511 within spaces 510, while space 513 does not employ an access device because access to space 513 may be unrestricted.

In these examples, access devices 506 may include moveable barriers 512, locking mechanisms 514, and control units 516. Moveable barriers 512 may move to allow and/or prevent access to an associated space, such as, for example, without limitation, space 513 within spaces 510. Locking mechanisms 514 may be capable of securing moveable barriers 512 in a closed position. When a moveable barrier is in a closed position, access to the associated space in spaces 510 may be prevented. Control units 516 may be capable of unlocking associated locking mechanisms in locking mechanisms 514 in a manner that provides different levels of access to spaces 510.

In a different advantageous embodiment, moveable barriers 512 may take different forms. For example, without limitation, a movable barrier may be a louver door, a blind door, a sliding door, a bypass door, flip up hatch, roll up door, slide out drawer, tip out compartment, removable panel, pocket door, flexible fabric section, or some other suitable barrier. Locking mechanisms 504 also may take different forms. For example, without limitation, a locking mechanism may be an electronic switch, a solenoid switch, a magnetic latch, an intelligent fastener, or some other suitable device. Control units 516 may include, for example, a radio frequency identification tag reader, a touch pad, a touch sensor, a magnetic stripe reader, a fingerprint scanner, a face recognition system, a retinal scanner, a voice recognition system, a thermal imaging unit, traditional key, or some other suitable device.

Further, access devices 506 may be homogenous or heterogeneous. For example, control units 516 may include a combination of, without limitation, a fingerprint scanner, a touch pad, and a voice recognition system. Locking mechanisms 514 may include, for example, without limitation, an electronic switch, and a solenoid switch. Moveable barriers 512 may include, for example, without limitation, a combination of a sliding door and bypass door. Of course, these example combinations of devices used within access devices may be implements in yet other combination depending on their particular implementation.

Control units 516 may provide access in response to an access request based on the identification the requester. In addition or alternatively, a mode of the aircraft also may be used to determine what access may be provided. For example, control units 516 may provide to certain spaces within spaces 310 of FIG. 3 if the aircraft is in a ground mode, in a maintenance mode, in the air mode, or in some other mode. Control units 516 include centrally managed control units 518 and/or locally managed control units 520.

In these examples, centrally managed control units 518 may send access requests 522 to data processing system 524. Access control requests 522 may be evaluated by data processing system 524 to determine whether to allow access to spaces 510 in area 508. In these examples, access requests 520 may be evaluated using access control list 526. Access control list 526 may identify users or personnel, which may be allowed access to various spaces 510. In response, responses 527 may be returned to indicate whether access should be provided.

Mode 528 of the aircraft may be another mechanism for providing hierarchical or different levels of access in these illustrative examples. Mode 528 may be set and/or identified by data processing system 524. Different personnel may be allowed access to different spaces depending on mode 528. Mode 528 may be, for example, a maintenance mode, an in flight mode, a cleaning mode, and/or some other suitable mode. Additionally, access control list 526 also may take into account different modes of operation of an aircraft in determining whether a user is permitted access to spaces 510.

In other advantageous embodiments, mode 528 of the aircraft may be used in combination with an identification of the requester to determine whether access is granted. For example, if an access request is made using a radio frequency tag badge that identifies the requester as being maintenance personnel while the aircraft is in an in flight mode, access to maintenance area may not be provided. If the aircraft is in a maintenance mode, then access may be provided to this user. For example, when the aircraft arrives at a gate, all access compartments and maintenance compartments can be awakened to listen for and/or be accessed by an access request from maintenance personnel.

Of course, in selected situations in which access is needed in flight, an override may be provided. This override, for example and without limitation, may allow access to a request originating from a radio frequency identification badge identifying the user as a maintenance person while the aircraft is in flight if a pilot overrides or changes the mode of the aircraft.

Use of an access card and/or other identification mechanism at a control unit results in a determination that may be made as to whether the aircraft may be in the appropriate state. The process then may check individual access requirements before unlocking the selected compartment. Attempts to access a lower lavatory cabinet by a maintenance person during flight when the aircraft is not in maintenance mode may result in a warning message being sent to appropriate personnel. In this manner, hierarchical access to different compartments as well as identification of breaches and/or access to spaces may be identified.

With locally managed control units 520, access to data processing system 524 and/or some other device is unnecessary. In these advantageous embodiments, locally managed control units may be used to access spaces 510 within area 508 without requiring physical tools. With this illustrative example, access is managed through an individual's knowledge as to how a locally managed control unit within locally managed control units 520 unlocks locking mechanisms 514. These locally managed control units may include, for example, without limitation, a hidden touch sensor, a mechanical latch, a series of actions security system, a magnetic latch, and/or an intelligent fastener.

With the use of a hidden touch sensor, a touch sensor may be located and concealed behind a sheet and/or panel on a wall that is close or within some selected distance of a locking mechanism. Access may be gained to the space by placement of a finger at the necessary location to activate the sensor. Further, in other advantageous embodiments, a coded activation may be required. This coded activation may include, for example, without limitation, moving a finger in a specified pattern, taping the sensor in a specified sequence, or some other suitable activation actions.

In this type of example, the locking mechanism may be, for example, an internal electronic latch, solenoid, or some other suitable locking mechanism. This locking mechanism may be a lock, allowing the moveable barrier to be opened in response to the appropriate activation of the touch sensor. The touch sensor may provide an area, such as line, circular area, or some other suitable region for providing activation and/or coded activation to unlock the locking mechanism.

In another advantageous embodiment, a mechanical latch may be employed for a locally managed control unit. In this illustrative example, a latch may require no electrical power. The mechanical latch may be manipulated to unlock the unlocking mechanism through a series of mechanical actions. These actions include, for example, without limitation, sliding the handle to the left until a nine o'clock position is reached, sliding the handle to the left until a click occurs, and then rotating the handle back to the right. This series of actions may allow the locking mechanism to unlock to open the moveable barrier to provide access to a space and/or compartment.

When a series of actions security system is used, a number of actions may be performed in a sequence before one or more compartments may be opened. For example, without limitation, with a lavatory, the lavatory door may be required to be opened and closed a number of times within a selected period of time before this type of locally managed control unit unlocks the barrier to the space.

As another example, this type of security system may allow access to selected spaces within the lavatory with the lavatory door being held open for some selected period of time. Further, an alert may be generated if the lavatory door is closed while the compartment door is still open within the lavatory.

In yet another example, locally managed control units 520 may include a magnetic latch. A magnet may be used as a tool to prevent others without knowledge of the magnetic latch from accessing a door or space.

In this manner, specialized keys are not required to access different compartments within an aircraft. Further, the management and handling of keys may be unnecessary. Further, with locally managed control units, having keys to different aircraft may not be needed. Additionally, problems with lost keys also may be avoided.

With locally managed control units 520, the knowledge of an individual may be used to gain access to different spaces within spaces 510. The knowledge is the information needed to access the different spaces within spaces 510. This knowledge may include, for example, without limitation, a location of locally managed control units 520, how to manipulate locally managed control units 520, and/or any other information needed to access spaces 510. Hierarchical access may be provided with different individuals having knowledge of how to unlock different locking mechanisms within locking mechanisms 514 through locally managed control units 520. In this manner, individuals without knowledge of locally managed control units 520 are unable to access spaces 510. Further, even if individuals are aware of locally managed control units 520, without the knowledge of what actions to take to unlock locking mechanisms 514, spaces 510 still may be inaccessible.

The different examples of centrally managed control units 518 and locally managed control units 520 may both determine whether to allow access to spaces 510. Centrally managed control units 518 may perform this function through sending access requests 522 to data processing system 522 and determining whether to allow access based on receiving responses 527. Locally managed control units 520 may perform this function without the aid of outside devices.

The different control units, in these examples, may increase and/or speed up accessibility to cabin crew and/or other authorized personnel opening a compartment. Further, locally managed control units may deter others that do not know the required sequence of actions.

The different components in hierarchical access system 500 have been presented for purposes of illustrating one implementation of an advantageous embodiment. These illustrations are not meant to limit the manner in which different control units may be implemented. For example, without limitation, other hierarchical access systems may include other types of control units in addition to or in place of the ones illustrated in these examples. In some advantageous embodiments, data processing system 524 may not be present with only locally manage control units 520 controlling access to spaces 510.

Figure 6:
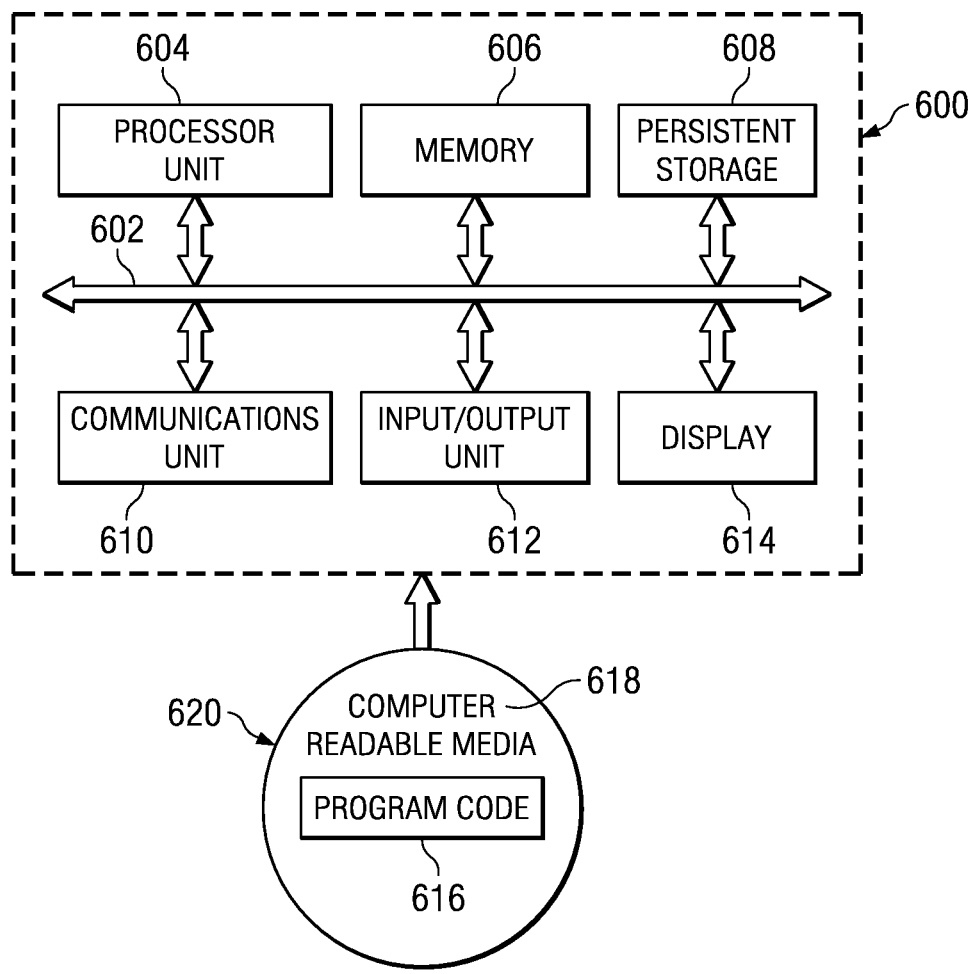
FIG. 6 is a diagram of a data processing system in accordance with an advantageous embodiment.

With reference now to FIG. 6, a diagram of a data processing system is depicted in accordance with an advantageous embodiment. In this illustrative example, data processing system 600 includes communications fabric 602, which provides communications between processor unit 604, memory 606, persistent storage 608, communications unit 610, input/output (I/O) unit 612, and display 614.

Processor unit 604 serves to execute instructions for software that may be loaded into memory 606. Processor unit 604 may be a set of one or more processors or may be a multi-processor core, depending on the particular implementation. Further, processor unit 604 may be implemented using one or more heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices. A storage device is any piece of hardware that is capable of storing information either on a temporary basis and/or a permanent basis. Memory 606, in these examples, may be, for example, a random access memory, or any other suitable volatile or non-volatile storage device. Persistent storage 608 may take various forms depending on the particular implementation. For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 may be a network interface card. Communications unit 610 may provide communications through the use of either or both physical and wireless communications links.

Input/output unit 612 allows for input and output of data with other devices that may be connected to data processing system 600. For example, input/output unit 612 may provide a connection for authorized user input through a keyboard and mouse or other medium. Further, input/output unit 612 may send output to a printer or portable memory device. Display 614 provides a mechanism to display information to an authorized user.

Instructions for the operating system and applications or programs are located on persistent storage 608. These instructions may be loaded into memory 606 for execution by processor unit 604. The processes of the different embodiments may be performed by processor unit 604 using computer implemented instructions, which may be located in a memory, such as memory 606. These instructions are referred to as program code, computer usable program code, or computer readable program code that may be read and executed by a processor in processor unit 604. The program code in the different embodiments may be embodied on different physical or tangible computer readable media, such as memory 606 or persistent storage 608.

Program code 616 is located in a functional form on computer readable media 618 that is selectively removable and may be loaded onto or transferred to data processing system 600 for execution by processor unit 604. Program code 616 and computer readable media 618 form computer program product 620 in these examples.

In one example, computer readable media 618 may be in a tangible form, such as, for example, an optical or magnetic disc that is inserted or placed into a drive or other device that is part of persistent storage 608 for transfer onto a storage device, such as a hard drive that is part of persistent storage 608.

In a tangible form, computer readable media 618 also may take the form of a persistent storage, such as a hard drive, a thumb drive, or a flash memory that is connected to data processing system 600. The tangible form of computer readable media 618 is also referred to as computer recordable storage media. In some instances, computer readable media 618 may not be removable.

Alternatively, program code 616 may be transferred to data processing system 600 from computer readable media 618 through a communications link to communications unit 610 and/or through a connection to input/output unit 612. The communications link and/or the connection may be physical or wireless in the illustrative examples. The computer readable media also may take the form of non-tangible media, such as communications links or wireless transmissions containing the program code.

The different components illustrated for data processing system 600 are not meant to provide architectural limitations to the manner in which different embodiments may be implemented. The different illustrative embodiments may be implemented in a data processing system including components in addition to or in place of those illustrated for data processing system 600. Other components shown in FIG. 6 can be varied from the illustrative examples shown.

As one example, a storage device in data processing system 600 is any hardware apparatus that may store data. Memory 606, persistent storage 608, and computer readable media 618 are examples of storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

Figure 7:
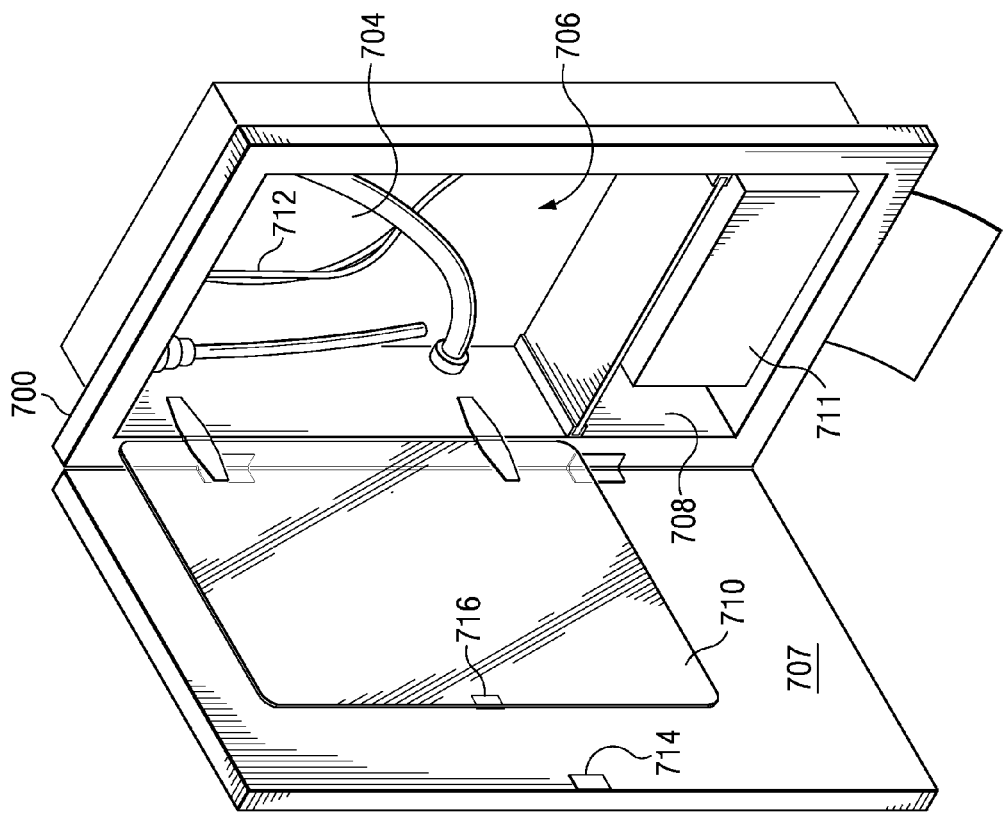
FIG. 7 is an illustration of a vanity cabinet with hierarchical access in accordance with an advantageous embodiment.

With reference now to FIG. 7, an illustration of a vanity cabinet with hierarchical access is depicted in accordance with an advantageous embodiment. In this example, second vanity cabinet 700 may be an example vanity cabinet 402 in FIG. 4. Second vanity cabinet 700 may have partitioning structure 702 to partition area 704 of second vanity cabinet 700 into space 706 and space 708. In this example, second moveable barrier 710 may prevent access to space 706. Moveable barrier 707 may prevent access to space 708 and to second moveable barrier 710. Space 708 may be a space for which restricted access may not be needed. For example, space 708 may contain paper towels 711. Partition area 704 in these examples includes various system components 712.

In these examples, moveable barrier 706 and moveable barrier 707 may be locked to secure space 708 and partition area 704 through the use of a latching system. In this example, latch 714 and second latch 716 may each be secured through a device, such as, for example, without limitation, solenoid to selectively provide access to space 708 and partition area 704. In some advantageous embodiments, latch 714 may not be secured by a solenoid or other locking mechanism if unrestricted access is unnecessary.

Figure 8:
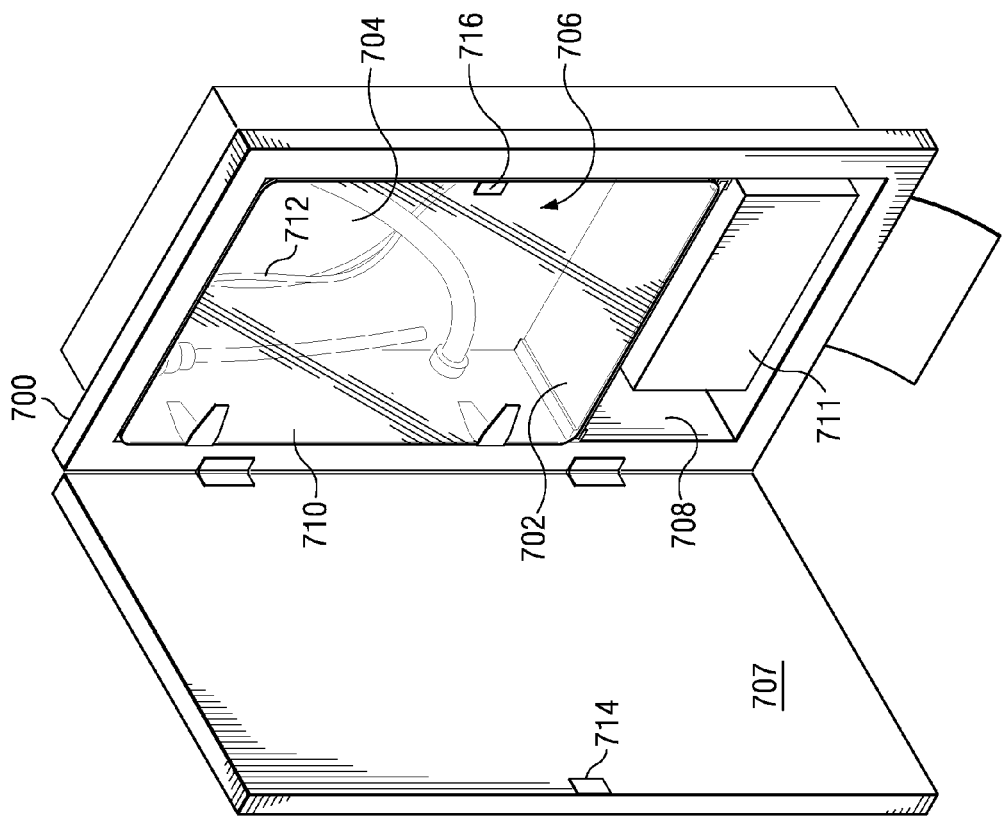
FIG. 8 is an illustration of a vanity cabinet with hierarchical access in accordance with an advantageous embodiment.

Turning now to FIG. 8, an illustration of a vanity cabinet with hierarchical access is depicted in accordance with an advantageous embodiment. In this example, the aircraft may be in a maintenance mode. In this mode, second moveable barrier 710 may be opened and access to space 706 may be obtained.

Figure 9:
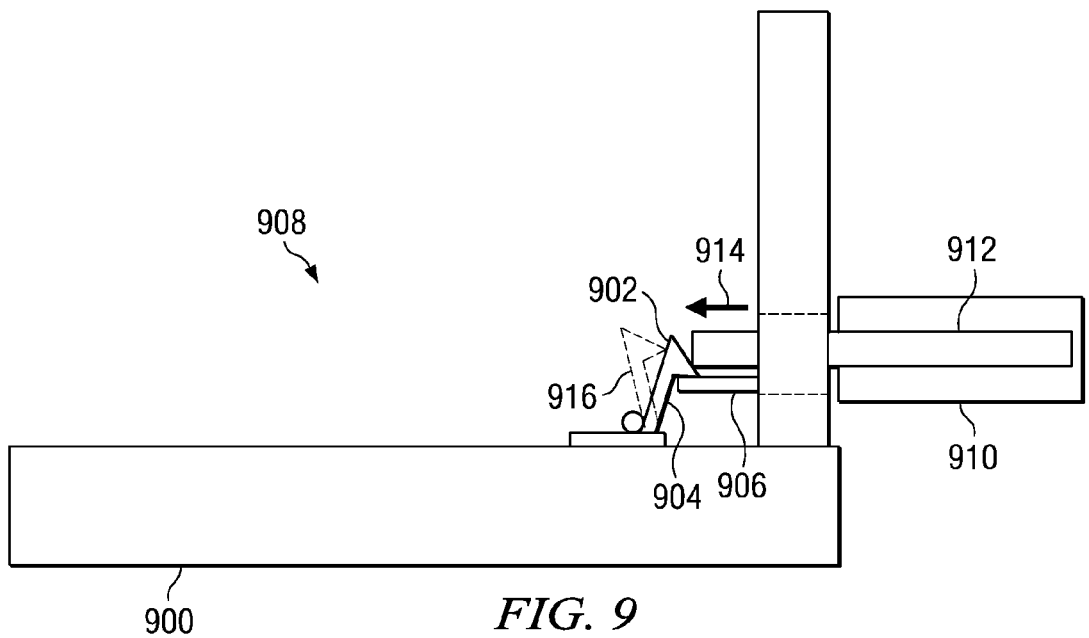
FIG. 9 is a diagram illustrating a latch mechanism for a movable barrier in accordance with an advantageous embodiment.

Turning now to FIG. 9, a diagram illustrating a latch mechanism for a movable barrier is depicted in accordance with an advantageous embodiment. In this example, third moveable barrier 900 may be, for example, moveable barrier 707 or second moveable barrier 710 in FIG. 7. Spring latch 902 may be secured to third moveable barrier 900. Spring latch 902 is moveable and may be secured as shown in position 904 as being engaged with latch 906. In this position, third moveable barrier 900 may not be opened or moved to access space 908. Spring latch 902 is normally biased in position 904 in which opening of third moveable barrier 900 may be prevented. In these examples, solenoid 910 includes plunger 912, which may be activated to push or move spring latch 902 in the direction of arrow 914 into position 916.

This illustration of a locking mechanism for third moveable barrier 900 is presented for purposes of illustrating one manner in which a locking mechanism may be implemented. Of course, other locking mechanisms may be used in other embodiments and this illustration is not meant to limit the manner in which locking mechanisms may be implemented in other embodiments.

Figure 10:
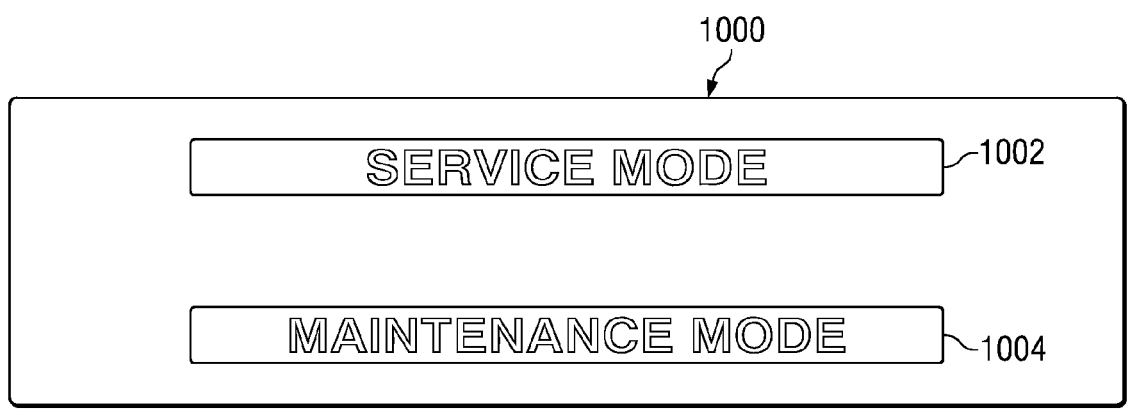
FIG. 10 is an illustration of an indicator sign identifying a level of access for an area in accordance with an advantageous embodiment.

Turning now to FIG. 10, an illustration of an indicator sign identifying a level of access for an area is depicted in accordance with an advantageous embodiment. In this example, sign 1000 may be an example of the sign that may indicate a level of access being provided for a particular space, such as, a lavatory. When section 1002 is lit, the area may be identified as being in a service mode. When section 1004 is lit, the area may be identified as being in a maintenance mode. These different levels of access may be provided depending on the mode of the aircraft.

In this example, sign 1000 may not be aesthetically interruptive to the environment. The text may be visible only when illuminated. In this advantageous embodiment, other types of signs and/or indicators may be used. For example, a set of series of light emitting diodes may light up with the appropriate text or wording indicating a current mode of the aircraft.

Figure 11:
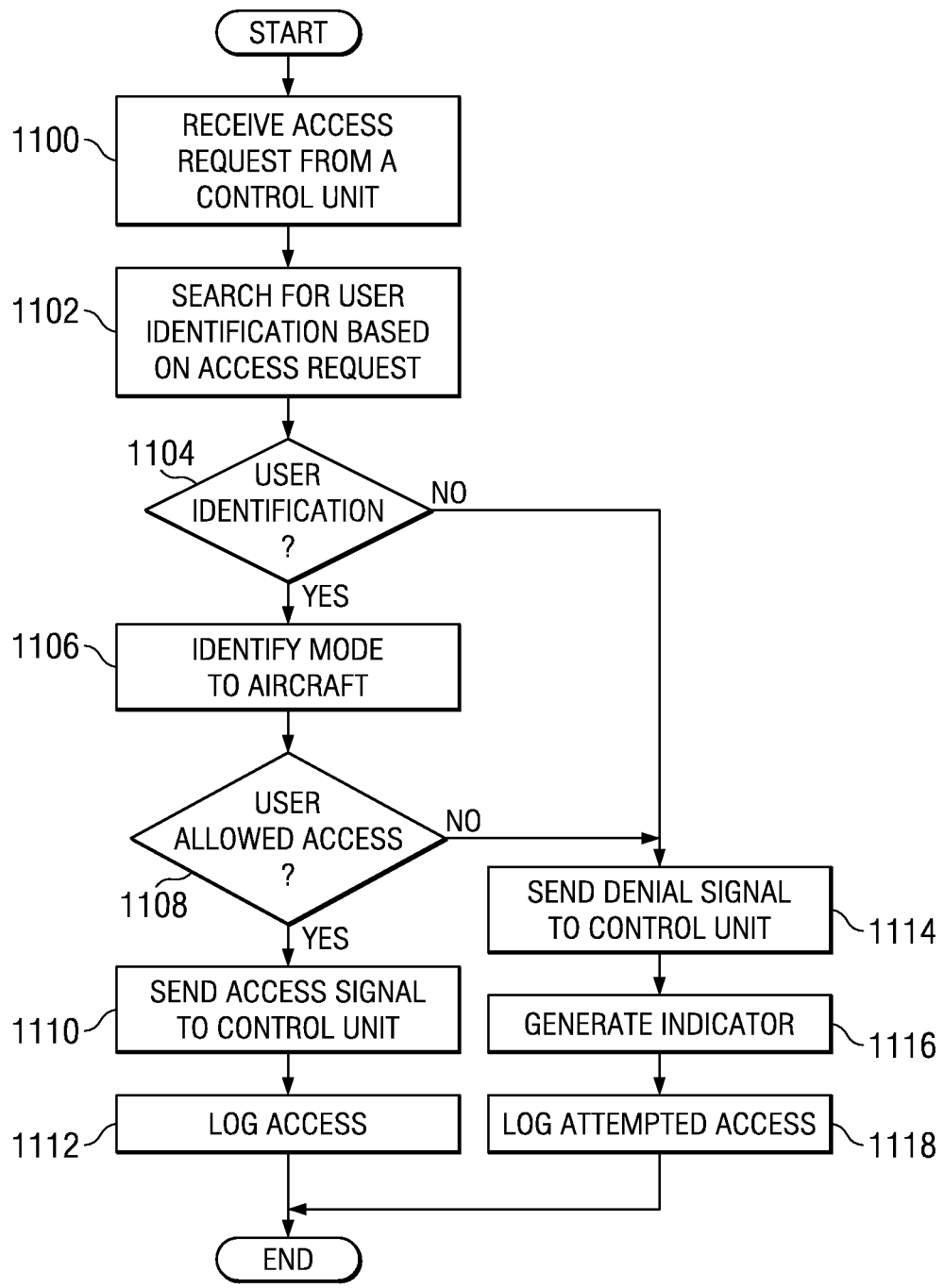
FIG. 11 is a flowchart of the process for processing access requests to restricted areas in an aircraft.

With reference now to FIG. 11, a flowchart of the process for processing access requests to restricted areas in an aircraft is depicted. The process illustrated in FIG. 11 may be implemented in a data processing system, such as data processing system 600 in FIG. 6.

The process begins by receiving an access request from a control unit (operation 1100). In these examples, the control unit may be a control unit, such as, for example, without limitation, a control unit within control units 516 in FIG. 5. The process then searches for a user identification based on the access request (operation 1102). This identification, of course, is based on the data sent.

For example, if the access request is based off a radio frequency identification card, then the user may be indirectly identified based on the information on the card. With data based off a biometric reading, such as a fingerprint, eye scan, or other biometric data, the user may be identified directly from the user input. Operation 1102 may take the data from the access request and may compare the data to an access control list to determine whether the user may be identified.

A determination may be made as to whether the user can be identified through the search (operation 1104). If the user can be identified, the mode of the aircraft may be identified (operation 1106). The mode of the aircraft may be, for example, without limitation, in-service, maintenance, in flight, overnight, or some other suitable mode.

Next, a determination may be made as to whether the user is allowed access (operation 1108). In these examples, operation 1108 may be determined by comparing the user to an access control list. This access control list also may be based on the mode of the aircraft. If the user is allowed access, then access signal may be sent to the control unit (operation 1110). The access signal causes the control unit to unlock the locking mechanism to allow the movable barrier to be moved. In this manner, a user may gain access to a restricted space in the aircraft. The process then may log the access (operation 1112).

In operation 1112, information that may be logged includes, for example, without limitation, identification of the user, the time and date of the access, the location of the access, and other suitable information that may be obtained. In this manner, a history or log of prior accesses may be kept. The process then terminates.

With reference again to operation 1108, if the user is not allowed access, then a denial signal is sent to the control unit (operation 1114). In some implementations, a signal may not be sent. The process then generates an indicator (operation 1116). This indicator may be generated to alert crewmembers and/or other suitable personnel that an access attempt has been made. The indicator may be presented in an area near the restricted space, in a crew area, in the cockpit, or some other suitable location.

The process then logs the attempt access (operation 1118) with the process terminating thereafter. With reference again to operation 1104, if the user cannot be identified, the process also proceeds to operation 1114, as described above.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the different advantageous embodiments may provide a method and apparatus for hierarchical access to different areas in an aircraft. This type of hierarchy may be implemented in all different areas in and/or on the aircraft. Further, the hierarchy system may be tied to data processing system that allows for a determination to be made based on a mode of the aircraft.

These different advantageous embodiments provide an ability to reduce and/or eliminate inspection of various spaces in an aircraft unless the hierarchy system identifies a space as compromised. In this manner, cost and gate turn around time may also be reduced. Further, the advantageous embodiments overcome problems of existing solutions, such as, for example, security tape. As mentioned before, these types of currently used mechanisms are aesthetically undesirable and inefficient because of continual inspection needs.

The different advantageous embodiments can include the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Although the different advantageous embodiments, in the illustrative examples, are describe with respect to an aircraft, one or more the different advantageous embodiments may be applied to other vehicles other than aircraft, such as, for example, without limitation, a bus, a passenger ship, a spacecraft, a submarine, a train, and other suitable vehicles. As another example, advantageous embodiments may be implemented to manage access to spaces office buildings, warehouses, and other suitable structures.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A hierarchical access system for a compartment in an aircraft, the hierarchical access system comprising:
    a first moveable barrier configured to prevent access to both of a first space and a second space when the first moveable barrier is in a first closed position, the second space positioned within the first space and wherein the first space comprises one of a lavatory and a galley;
    a second movable barrier configured to prevent access to only the second space when the second movable barrier is in a second closed position, wherein the second moveable barrier is disposed such that the second space is inside the first space, and the second space is one of either a cabinet in the lavatory or a locker in the galley;
    a first locking mechanism connected to the first movable barrier, wherein the first locking mechanism is configured to secure the first moveable barrier in the first closed position;
    a second locking mechanism connected to the second moveable barrier, wherein the second locking mechanism is configured to secure the second moveable barrier in the second closed position; and
    a control unit connected to the first locking mechanism and to the second locking mechanism, wherein the control unit is configured to selectively unlock one or both of the first locking mechanism and the second locking mechanism in a manner that provides different levels of access to the first space relative to the second space in the compartment in response to receiving an access request, wherein the control unit provides one level of access to the first space and the second space when the aircraft is in a first mode and provides another level of access to the first space and the second space when the aircraft is in a second mode, modes of the aircraft including at least ground mode, maintenance mode, and air mode, wherein the control unit provides open access by unlocking the first locking mechanism and the second locking mechanism when the aircraft is in maintenance mode, and wherein the control unit provides restricted access by locking the second locking mechanism when the aircraft is in ground mode or air mode.

2. The hierarchical access system of claim 1, wherein the control unit provides access to the first space in response to the access request identifying a requestor as a person in a first group of personnel authorized to access the first space in a first mode and providing access to the second space in response to identifying the requester as a person in a second group of personnel authorized to access the second space in a second mode.

3. The hierarchical access system of claim 1, wherein the control unit is selected from one of a radio frequency identification tag reader, a touch pad, a touch sensor, a magnetic strip reader, a finger print scanner, a face recognition system, a retinal scanner, a voice recognition system, and a thermal imaging unit.

4. The hierarchical access system claim 1, wherein the locking mechanism is selected from one of an electronic latch, a solenoid latch, a magnetic latch and an intelligent fastener.

5. The hierarchical access system of claim 1, wherein the first locking mechanism connects to the second locking mechanism when the first moveable barrier is in the first position and the second moveable barrier is in the second closed position.

6. The hierarchical access system of claim 1, wherein the control unit provides access to the first space in response to the access request identifying a requestor as a person in a first group of personnel and providing access to the second space in response to identifying the requester as a person in a second group of personnel.

7. The hierarchical access system of claim 6, wherein the control unit generates a warning message when the access request is unsuccessful.

8. The hierarchical access system of claim 1, wherein the control unit provides open access to all personnel to the first space and the second space when the aircraft is in maintenance mode, and wherein the control unit provides restricted access to flight attendant personnel to the second space when the aircraft is in air mode.

9. An apparatus comprising:
    a set of structures partitioning an enclosed area into a first space and a second space, wherein the set of structures are configured such that the first space and the second space are nested relative to each other, the second space positioned within the first space;
    a first moveable barrier configured to prevent access to the first space and the second space when the moveable barrier is in a closed configuration;
    a second movable barrier configured to prevent access to only the second space when the second movable barrier is in a second closed position;
    a first locking mechanism configured to lock the first moveable barrier in the closed configuration;
    a second locking mechanism configured to lock the second moveable barrier in the second closed position; and
    a control unit configured to lock and unlock the first and second locking mechanisms in response to using a policy to evaluate a request to access the first or second space, configured to selectively provide different access relative to the first space and the second space,
    wherein the policy provides access to the first and second spaces within the enclosed area based on a mode of an aircraft and an identification of a user, modes of the aircraft including at least ground mode, maintenance mode, and air mode, and wherein the control unit provides open access to the first space and the second space when the aircraft is in maintenance mode, and wherein the control unit provides restricted access to the second space to flight attendant personnel when the aircraft is in air mode, wherein the control unit provides open access by unlocking the first locking mechanism and the second locking mechanism when the aircraft is in maintenance mode, and wherein the control unit provides restricted access by locking the second locking mechanism when the aircraft is in ground mode or air mode.

10. The apparatus of claim 9, wherein the locking mechanism is selected from one of an electronic latch, a solenoid latch, a magnetic latch, and an intelligent fastener, wherein the first space comprises one of a lavatory and a galley and the second space comprises a cabinet in the lavatory or a locker in the galley.

11. The apparatus of claim 9, wherein the control unit is selected from one of a radio frequency identification tag reader, a touch pad, a magnetic strip reader, a finger print scanner, a face recognition system, a retinal scanner, a voice recognition system, a thermal imaging unit, a hidden latch sensor, a mechanical latch, a series of actions security system, a magnetic latch, and an intelligent fastener.

12. The apparatus of claim 9, wherein the first and second movable barriers are selected from one of a louver door, a blind door, a sliding door, a bypass door, a pocket door, a roll up door, a flip up patch, a slide out drawer, a tip out compartment, a removable panel, and a removable fabric barrier.

13. The apparatus of claim 9, wherein the policy allows a different set of users to access each of the plurality of spaces and wherein the request identifies a user.

14. The apparatus of claim 9, wherein the policy allows access to the user and a set of maintenance personal when the aircraft is in a maintenance mode.

15. The apparatus of claim 9, wherein the policy allows access to the user and a set of service personal when the aircraft is in a service mode.

16. The apparatus of claim 9, wherein the enclosed area is selected from one of a lavatory cabinet, an area behind a cabin wall, a cargo hold, a cabinet in a gallery, and an air return grill.

17. A hierarchical access system for a compartment in an aircraft, the hierarchical access system comprising:
a first space in the aircraft and a second space in the aircraft, wherein the second space is inside the first space, the first space comprising a lavatory or a galley, the second space comprising a storage area;
a first moveable barrier configured to prevent access to both of the first space and the second space in the compartment, when the moveable barrier is in a closed position, and wherein the moveable barrier is selected from one of a louver door, a blind door, a sliding door, a bypass door, a roll up door, a flip up hatch, a slide out drawer, a tip out compartment, a panel, a pocket door, and a removable fabric barrier;
a second moveable barrier configured to prevent access to the second space when the second moveable barrier is in a closed position;
a first locking mechanism configured to secure the first moveable barrier in the closed position;
a second locking mechanism connected to the second movable barrier, wherein the second locking mechanism is configured to secure the second moveable barrier in the closed position; and
a control unit configured to unlock the first and second locking mechanisms in a manner that provides different levels of access to the first space relative to the second space in the compartment in response to receiving an access request, wherein the control unit provides access to the first space based on a mode of the aircraft, the modes including at least ground mode, maintenance mode, and air mode, wherein the control unit provides open access by unlocking the first locking mechanism and the second locking mechanism when the aircraft is in maintenance mode, and wherein the control unit provides restricted access by locking the second locking mechanism when the aircraft is in ground mode or air mode.

* * * * *